United States Patent [19]

Dunne

[11] Patent Number: 4,510,428

[45] Date of Patent: Apr. 9, 1985

[54] CONTROL SYSTEM FOR MANIPULATOR APPARATUS WITH INITIALIZING STABILIZATION AND INERTIA SCALING

[75] Inventor: Maurice J. Dunne, Newtown, Conn.

[73] Assignee: Unimation, Inc., Danbury, Conn.

[21] Appl. No.: 478,646

[22] Filed: Mar. 25, 1983

[51] Int. Cl.³ ............................................. G05D 23/275
[52] U.S. Cl. ................................... 318/632; 318/568
[58] Field of Search ................. 318/568, 632, 561; 901/23; 364/170

[56] References Cited

U.S. PATENT DOCUMENTS

| | | | |
|---|---|---|---|
| 4,011,437 | 3/1977 | Hohn | 318/568 X |
| 4,025,838 | 5/1977 | Watanabe | 318/568 |
| 4,140,953 | 2/1979 | Dunne | 318/568 |
| 4,300,198 | 11/1981 | Davini | 318/568 X |
| 4,362,978 | 12/1982 | Pollard | 318/568 |

*Primary Examiner*—B. Dobeck
*Attorney, Agent, or Firm*—Mason, Kolehmainen, Rathburn & Wyss

[57] ABSTRACT

A control system is provided for servo controlled apparatus such as a programmable manipulator having a manipulator arm movable in a plurality of axes. The control system provides improved dynamic performance and control of the manipulator arm over a wide range of arm loads, dynamic operating parameters of the arm and over the full range of operating positions. The control system for one or more of the controlled axes includes servo control loops utilizing various feedback signals. In one arrangement, an inertia correlated signal provided as a pressure signal from a hydraulic actuator of an appropriate axis is utilized in combination with a function generator circuit to provide variable inertial scaling of selected loop command signals. The axis utilized for the pressure signal is determined by the mounting of the manipulator apparatus so as to provide a signal correlated to the inertial mass system of the manipulator arm. A pressure signal from an actuator of an axis to be controlled is utilized to initialize the command signals for the axis upon power turn-on of the control system to provide stabilization of the manipulator arm during the power turn-on and initializing phase.

22 Claims, 18 Drawing Figures

CONTROL SYSTEM FOR MANIPULATOR APPARATUS WITH INITIALIZING STABILIZATION AND INERTIA SCALING

BACKGROUND OF THE INVENTION

A. Field of the Invention

The present invention relates to control systems for manipulator apparatus and more particularly to an improved control system for manipulator apparatus utilizing servoloops that provide improved dynamic performance and initializing stabilization of the manipulator arm in a plurality of controlled axes by the use of variable inertia scaling and initializing of command signals via force and inertia correlated feedback from the actuators of predetermined axes.

B. Description of the Prior Art

Various control systems for manipulator apparatus have been proposed and/or implemented utilizing servo-loops having command signals and feedback signals to position a manipulator arm controlled by a plurality of axes.

Control systems of this type, for example, are disclosed in U.S. Pat. Nos. 4,362,978; 3,661,051; 4,086,522; 4,132,937; 4,338,672; 4,156,835 and 4,243,923. The control system of U.S. Pat. No. 4,362,978 provides a torque/force command loop utilizing force or pressure feedback and inertia scaling of various command signals. The inertia scaling is accomplished either by look up table or on-line computation utilizing load weight and arm position as parameters. The control system of U.S. Pat. No. 3,661,051 utilizes a servoloop having position command signals and position feedback signals to control the manipulator arm. U.S. Pat. No. 4,086,522 utilizes position and velocity command signals, and position and velocity feedback in a servo control loop. U.S. Pat. No. 4,132,937 utilizes dynamic feedback including acceleration feedback and velocity feedback data that is combined with the position error signal to stabilize the control and operation of the manipulator arm by providing a high negative dynamic feedback signal during deceleration and a low signal during the acceleration phase to avoid conflict between the positional error signal and the dynamic feedback signal. U.S. Pat. No. 4,086,522 utilizes a servo-loop having position, velocity and acceleration command signals and position, velocity and acceleration feedback for control of the manipulator arm.

While the above prior art arrangements have, in general, been found satisfactory for their intended purpose, there is a continuing need in many manipulator applications for improved initializing stabilization and dynamic performance while maintaining servo-loop stability. Further, there is a need for improved dynamic performance of manipulator arm control where the manipulator arm experiences a wide variation in arm loads during performance of a work task.

SUMMARY OF THE INVENTION

It is therefore a primary object of the present invention to provide a new and improved control system for manipulator apparatus that results in improved dynamic performance and initializing stabilization of a manipulator arm in a plurality of controlled axes over the full range of manipulator arm operating parameters including the range of operating position of the various axes, the full range of arm loads, and the dynamic operating parameters of the arm.

It is another object of the present invention to provide a new and improved control system for manipulator apparatus having a manipulator arm that utilizes variable inertia scaling for various command signals and loop parameters and a servo-loop to provide improved dynamic performance of the manipulator arm over its full operating range, the variable inertia scaling being provided via a sensed signal from the arm that is correlated to the inertial mass system of the arm.

It is another object of the present invention to provide an initializing stabilization arrangement for the start-up sequence of manipulator apparatus to ensure stability of the manipulator arm.

It is a further object of the present invention to provide an initializing stabilization arrangement in a control system for manipulator apparatus having a servo-control loop including a velocity control loop and a force or pressure loop including force or pressure feedback from the manipulator arm wherein the velocity and force loops each include an integration function; the force loop integration function being eliminated and the velocity loop integration function being initialized in accordance with the force or pressure feedback signal for a predetermined initializing time period after power turn on and start-up of the manipulator apparatus.

Briefly, these and other objects of the present invention are achieved by providing a control system for servo controlled apparatus such as a programmable manipulator having a manipulator arm movable in a plurality of axes. The control system provides improved dynamic performance and control of the manipulator arm over a wide range of arm loads, dynamic operating parameters of the arm and over the full range of operating positions. The control system for one or more of the controlled axes includes servo control loops utilizing various feedback signals. In one arrangement, an inertia correlated signal provided as a pressure signal from a hydraulic actuator of an appropriate axis is utlized in combination with a function generator circuit to provide variable inertial scaling of selected loop command signals. The axis utilized for the pressure signal is determined by the mounting of the manipulator apparatus so as to provide a signal correlated to the inertial mass system of the manipulator arm. A pressure signal from an actuator of an axis to be controlled is utlized to initialize the command signals for the axis upon power turn-on of the control system to provide stabilization of the manipulator arm during the power turn-on and initializing phase.

The invention both as to its organization and method of operation together with further objects and advantages thereof will best be understood by reference to the following specification taken in connection with the accompanying drawings.

DETAILED DESCRIPTION OF THE PREFERRED EMBODIMENT

Figure 1:
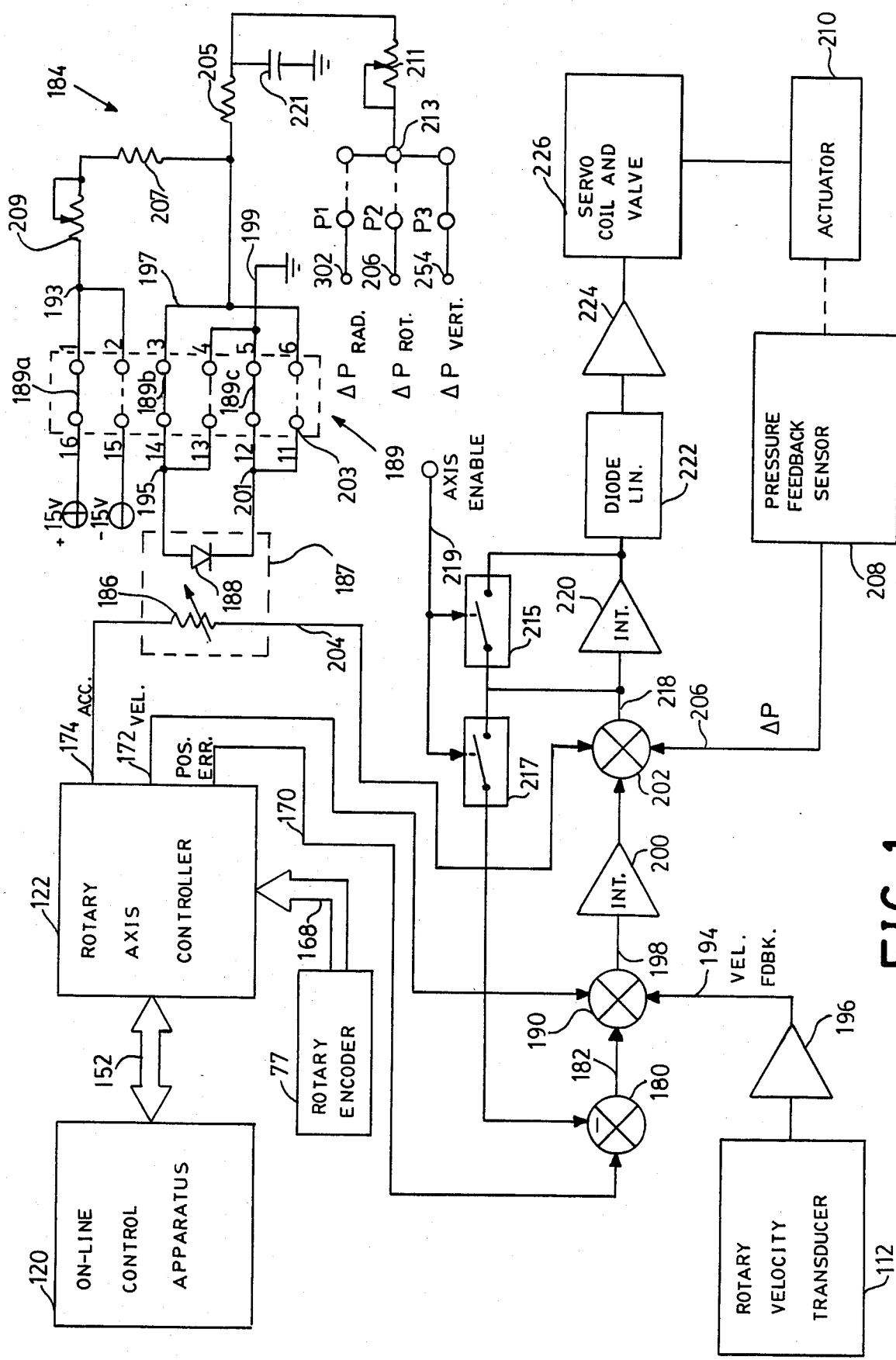
FIG. 1 is a block, schematic and logic diagram of the control system for the rotary axis of the manipulator in accordance with the present invention.
Figure 2:
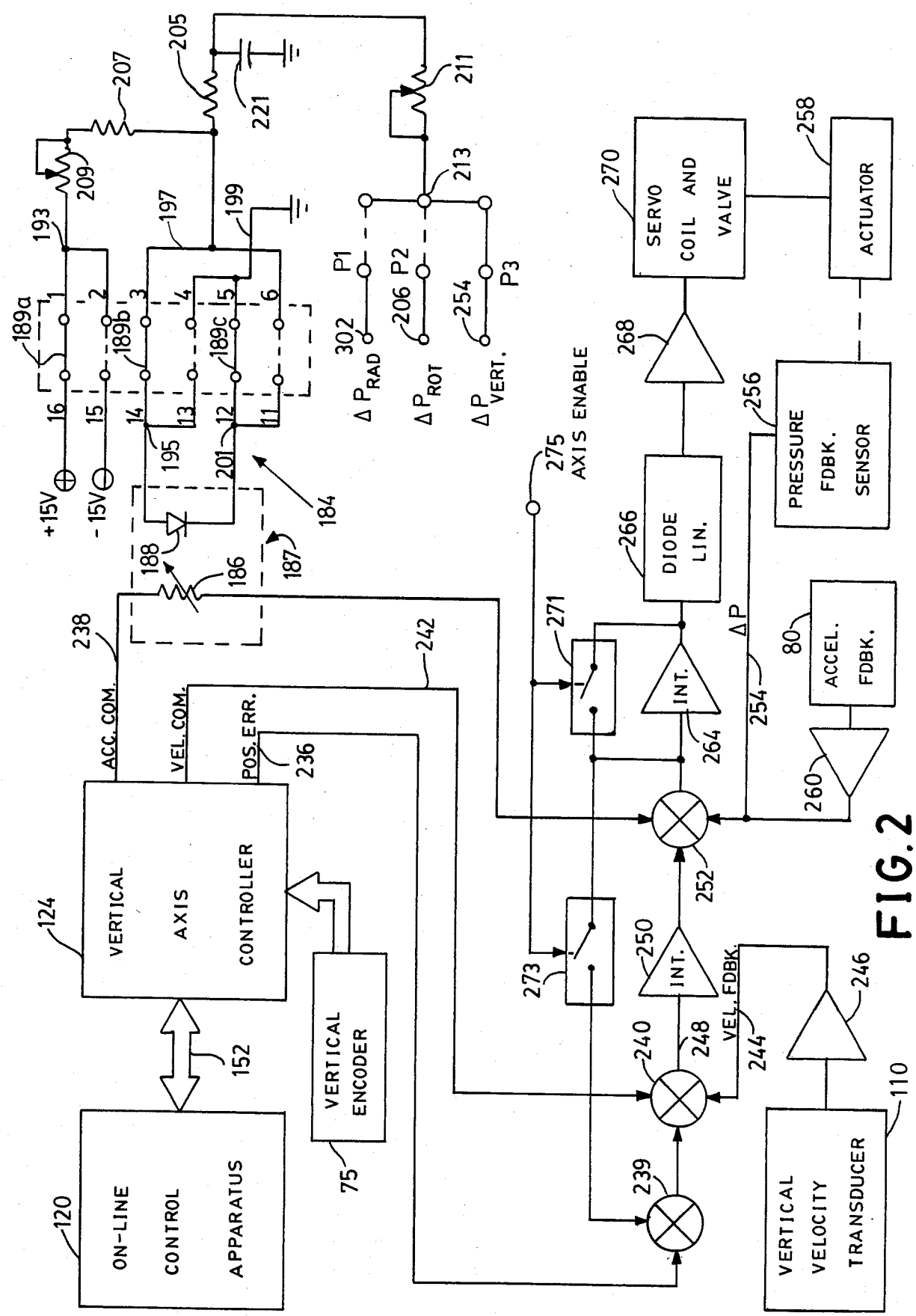
FIG. 2 is a block, schematic and logic diagram of the control system for the vertical axis of the manipulator in accordance with the present invention.
Figure 3:
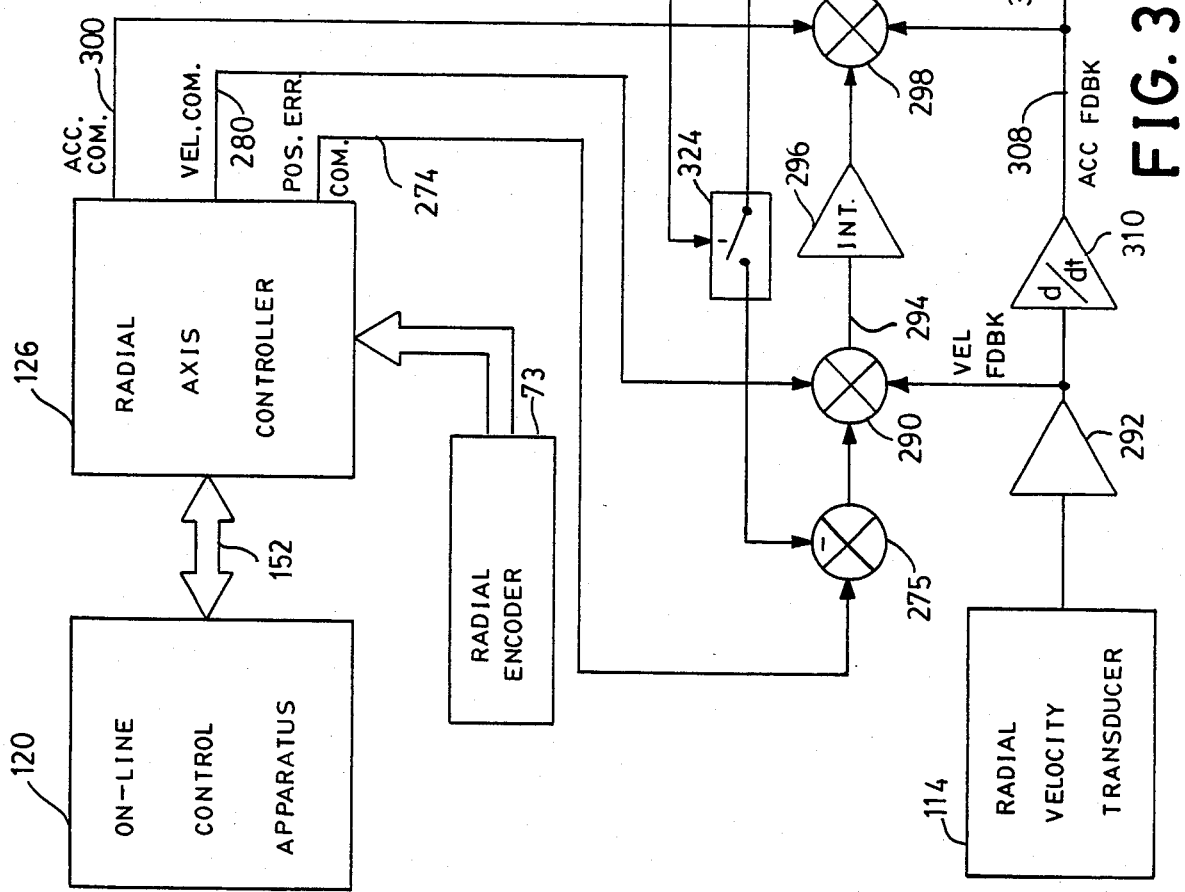
FIG. 3 is a block, schematic and logic diagram of the control system of the present invention for the radial axis of the manipulator in accordance with the present invention.

Referring now to FIGS. 1 through 3, the control system of the present invention is useful for the control of manipulator appartus and the like, for example of the type shown in U.S. Pat. No. 4,362,978 which is incorporated by reference herein for all purposes. This type of manipulator is available commercially as a UNIMATE ® 4000 Series Industrial Robot from Unimation, Inc. The manipulator apparatus includes a manipulator arm which is movable to provide programmed articulations in a plurality of degrees of freedom or axes of the manipulator arm.

Referring now to FIG. 1 of U.S. Pat. No. 4,362,978, the base 50 supports a control cabinet indicated generally at 52 within which is housed the electronic control apparatus of the manipulator apparatus, for example the control system of the present invention. The hydraulically powered manipulator arm comprises a boom assembly indicated generally at 54 which is pivotally mounted for movement about a horizontal axis on a trunk portion 56 which is rotatably mounted on a vertically extending column the bottom portion of which is secured to the platform 50.

The boom assembly 54 is tilted to give a down-up (Vertical axis) motion of the outer end of the manipulator arm and includes a pair of hollow extendable arm portions 58 which are arranged to be moved in and out of the boom assembly 54 and provide a radial extension or retraction articulation (Radial axis).

The arm portions are secured to a crosshead assembly 60 which carries a projecting hand portion 62. The hand portion 62 is rotatably mounted in the crosshead assembly 60 to be rotated about a Wrist Bend axis 64 which is in the same general direction as the down-up articulation of the arm. The hand 62 also includes a rotatable extending outer hand portion 66 which is arranged to rotate about a radial axis 68 to produce a wrist swivel (Yaw axis) movement or articulation of the hand. The outer hand portion 66 is provided with an implement accepting socket 70 which is arranged to be fitted with various manipulator hand implements or welding guns. The implement socket portion 70 extends in a direction perpendicular to the wrist swivel axis 68 and is mounted within the outer hand portion 66 to be rotated about an axis 72 to produce a hand swivel articulation (Swivel axis).

The entire boom assembly 54 is arranged to be rotated about the vertical axis of the trunk 56 to produce the sixth articulation or degree of freedom of the manipulator apparatus called the Rotary axis motion.

The various hydraulic and mechanical drive train arrangements to provide the aforementioned movement in the six axes are described in U.S. Pat. No. 3,661,061 to which reference may be made for a detailed description.

The movement in the six axes referred to as Rotary, Vertical, Radial, Wrist Bend, Yaw and hand Swivel movement, is controlled by the control system of the present invention as will be explained in more detail hereinafter in connection with FIGS. 1 through 3.

In order to provide digital information representing the absolute position of the arm and hand assembly in each of the six controlled axes of movement, there is provided a series of six digital encoders, 73 (Radial), 74 (Yaw), 75 (Vertical), 76 (Bend), 77 (Rotary) and 78 (Swivel) one for each controlled axis as described in more detail in the above referenced U.S. Pat. No. 3,661,051 and as represented in FIGS. 3 through 6 of U.S. Pat. No. 4,362,978.

Referring again to FIG. 1 of U.S. Pat. No. 4,362,978, to provide acceleration feedback in the vertical axis an accelerometer or other suitable dynamic sensing assembly 80 is mounted near the outer end of the manipulator boom assembly 54. The acceleration feedback in the vertical axis is selectively utilized in one embodiment of the control system of the present invention.

To provide velocity feedback in the Bend, Swivel and Yaw axes, LVT (linear velocity transducer) devices (Bend) (Yaw) and (Swivel) are provided in one arrangement to directly sense the velocity of the respective actuators of each axis. In an another arrangement, tachometers 82, 84 and 86 as shown in FIG. 2 of U.S. Pat. No. 4,362,978 are arranged to sense rotation about tne Bend, Yaw and Swivel axes respectively. The LVT devices are preferred since they are believed to be more reliable than tachometer sensing. The tachometers may be desirable in a situation where the actuators are not readily accessible for mounting of the LVT devices.

To provide velocity feedback information for the Vertical, Rotary, and Radial axes, LVT devices or other suitable dynamic sensing devices 110, 112 and 114 as will be more fully discussed in connection with FIGS. 1 through 3 are provided to sense axis actuator movement or at other suitable locations in the drive trains of the various axes of the manipulator apparatus to sense motion in the Vertical, Rotary and Radial axes respectively.

Figure 6:
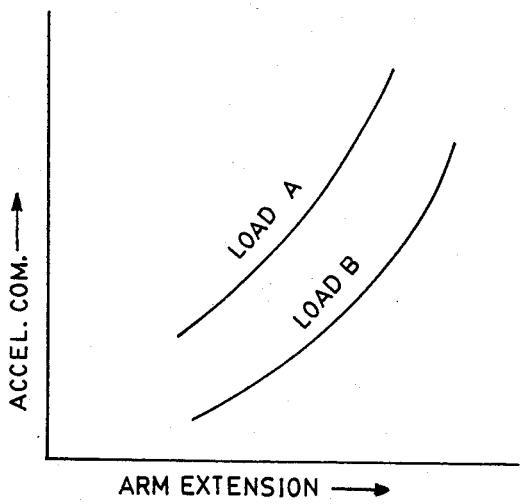

Considering now the control system of the present invention and referring to FIGS. 1 through 3, in one arrangement of the present invention for illustrative purposes, the control system includes: on-line control apparatus 120; axis controller stages 122, 124 and 126 for each of the respective Rotary, Vertical, and Radial axes; and the analog servo-loop circuitry 140, 142 and 144 in the Rotary, Vertical, Radial and Bend, axes respectively. The control system of the present invention also includes control arrangements generally as shown in FIG. 6 of U.S. Pat. No. 4,362,978 for the Bend, Yaw and Swivel axes as will be discussed in more detail hereinafter.

The on-line control apparatus 120 communicates with the respective axis controller stages 122, 124 and 126 via a digital data bus 152. The on-line control apparatus 120 includes a memory (not shown) having stored therein data representing the positions in each of the controllable axes to which the manipulator is to be moved over a predetermined work program. The on-line control apparatus 120 also includes either electronic circuitry, or a computer or microprocessor (not shown) that utilizes the data stored in the memory for generating basic command signals to each of the axis controllers 122, 124 and 126 via the data bus 152 including position and velocity command signals.

Referring to FIG. 3 of U.S. Pat. No. 4,362,978, each of the axis controllers 122, 124 and 126 includes an axis mircoprocessor 154, a RAM (random access memory)

stage 156, and an EPROM (electronically programmable read only memory) stage 158, a digital to analog converter stage 160 and a sample and hold output stage 162. The data input and output lines of the microprocessor 154, the RAM 156, the sample and hold stage 162, the EPROM stage 158 and the D to A converter 160 are interconnected by a data bus 164. Additionally, the microprocessor 154 includes an address output data bus 166 connected to address the EPROM 158 and the RAM 156.

The axis controller stages 122, 124 and 126 are arranged to calculate and output analog position error, velocity and acceleration command signals. For example, the Rotary axis controller stage 122 of FIG. 1 provides position error command signals at 170, velocity command signals at 172 and acceleration command signals at 174 in response to the basic position and velocity command signals received from the online control apparatus 120 via the data bus 152. The rotary encoder 77, the vertical encoder 75 and the radial axis controller 73 are sequentially connected to provide position feedback data to the axis controller stages 122, 124 and 126 via respective output data lines. The initial calculations performed by the axis control stages 122, 124 and 126 to calculate position, velocity and acceleration control signals is similar to the function performed by the on-line computation and control apparatus 18 of U.S. Pat. No. 4,086,522 to which reference may be made for more detailed discussion of these computations. Further, commercial control apparatus performing the functions of the on-line control appartus 120 and the axis controller stage 122, 124 and 126 is available from Unimation, Inc.

Considering now the rotary analog servo-loop 140 of FIG. 1, the position error command signal 170 is connected to one input of a summer stage 180. The output 182 of the summer stage 180 is connected as a first input to a second summer stage 190. The summer stage 190 also includes as two additional inputs the analog velocity command signal 172 and a velocity feedback signal 194 as derived from the rotary velocity transducer stage 112 through an amplifier 196. The combined output 198 of the summer 190 is connected through an amplifier/integrator stage 200 to one input of a summer stage 202. The summer stage 202 includes as two additional inputs the analog acceleration command signal 204 and a ΔP pressure feedback signal 206.

The ΔP pressure feedback signal 206 is a differential pressure signal obtained by a pressure feedback sensor 208 that directly measures the differential pressure across the double acting actuator 210 at the manifold of the actuator.

The acceleration command signal 174 is connected through an inertial scaling stage referred to generally at 184 to provide an inertial scaled acceleration command signal 204. The operation of the inertia scaling stage 184 will be explained in more detail hereinafter.

The output 218 of the summer stage 202 is connected through an amplifier/integrator stage 220 and a diode linearizer circuit 222 to a power amplifier circuit 224. The power amplifier circuit 224 drives the servo-coil of the rotary axis servo-coil and valve arrangement 226. The servo-coil and valve arrangement 226 drives the actuator 210 to appropriately position the manipulator arm in the rotary axis.

In accordance with important aspects of the present invention, the variable inertia scaling of the acceleration command signal 174 to provide the inertia scaled acceleration command signal 204 provides improved dynamic performance in accordance with the changes in the inertial mass system represented by the manipulator arm as varied for example by arm position and arm load. By means of the variable inertia scaling, loop gains are maximized in accordance with stable loop operation over the inertial range encountered by the manipulator arm. In servo-loop control systems wherein variable inertial scaling of the present invention is not provided, the variation in inertia of the manipulator arm throughout the operating range of work loads and arm positions results in a wide range of loop gains for stable operation. Thus typical servo-loops are required to be designed in accordance with stable operation at the loop gains inherent for stable operation for the worst case, minimum inertial loads encountered by the manipulator arm. Of course, this results in a degradation of dynamic performance as opposed to variable inertial scaling arrangements as provided by the control system of the present invention as exemplified by the rotary servo-loop arrangement 140 of FIG. 1.

The use of pressure feedback has been found desirable as representative of the inertial mass system of the manipulator arm and in combination with the variable inertia scaling provides a torque or force loop that results in improved dynamic performance of the control system of the present invention. Thus the use of pressure feedback in combination with the variable inertia scaling provides improved dynamic performance over systems utilizing acceleration feedback which is difficult and in some situations nearly impossible to accurately obtain on practical manipulator arm structures. The use of the inertia scaled acceleration or force loop in the servo-control for a manipulator arm is advantageous to provide a fast loop response to changing dynamic conditions of the manipulator arm.

The inertia scaling stage 184 includes a variable resistance element 186 that is connected in series between the acceleration command signal 174 and the inertia scaled acceleration command signal 204. The control input to the inertia scaling stage for varying the resistance of the element 186 includes a pressure feedback signal. Referring now to FIGS. 4 through 8, the differential pressure sensed across a double acting actuator for an appropriate axis of the manipulator arm provides a signal that is correlated to the inertial mass system of the arm.

Figure 4:
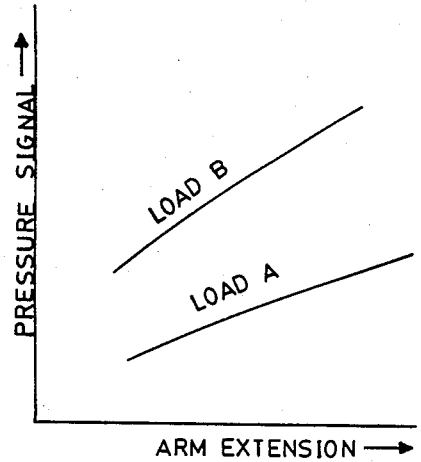
FIGS. 4 through 7 are graphical representations of various parameters and feedback signals useful for explanation of the present invention.
Figure 5:
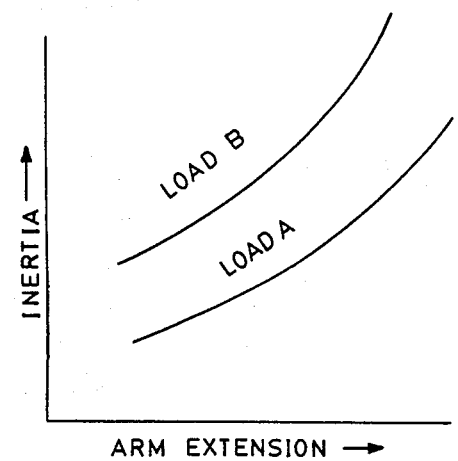

For example, and referring now to FIG. 4, for a manipulator mounted as shown in FIG. 8a with the base on the floor or ground plane and gravity acting on the vertical or up-down axis motion, the pressure signal ΔP at 254 of FIG. 2 versus the arm extension is linear for a given load on the arm. Further and referring to FIG. 5, the change in inertia of the arm versus arm extension follows the square of the arm extension.

Referring now to FIG. 6, the desired command signal optimized for inertial variations for the force loop of the rotary axis loop circuit 140 of FIG. 1 also follows the square of the arm extension.

Figure 7:
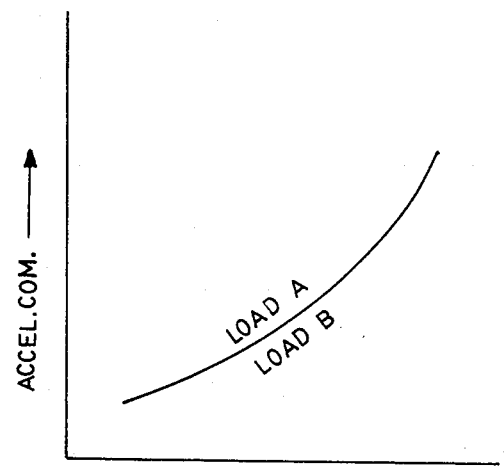

Considering the differential pressure signal available at 254 that is correlated to the inertia of the manipulator arm and the desired acceleration command signal and referring additionally to FIG. 7, the acceleration command signal optimized for inertia variation can be correlated in accordance with the present invention with the differential pressure signal at 254 resulting in the inertia scaled acceleration command at 204 optimally varying in accordance with the square of the differential pressure signal at 254 for all loads on the arm.

Thus, the inertia scaling stage 184 utilizes the pressure signal 254 as an input to scale the acceleration command signal at 174 by varying the resistance of element 186 as the square of the change in pressure signal at 254. This provides the desired inertia scaled acceleration command signal at 204 as an appropriate optimum force or torque signal.

In the preferred embodiment, the inertia scaling stage 184 includes provision for the selective connection of the respective ΔP signals at 254, 206 and 302 from the Vertical, Rotary and Radial axis actuators respectively.

Figure 8:
FIGS. 8a through 8f are pictorial representations of various manipulator mounting orientations to illustrate features of the present invention.
Figure 8:
Figure 8:
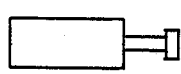
Figure 8:
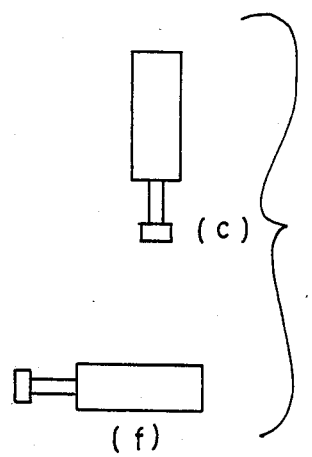

Referring now to FIG. 8, the vertical axis ΔP signal 254 is utilized for inertia scaling when the manipulator is mounted in the floor or ceiling position of FIGS. 8a and 8b respectively. Further, the rotary axis ΔP signal 206 is utilized for inertia scaling when the manipulator is mounted in either the arm boom down or arm boom up positions of FIGS. 8c or 8d respectively since the rotary actuator pressure signal is correlated to arm inertia with gravity acting on the arm about the rotary axis. Finally, with the manipulator mounted with the arm boom mounted to the right or left in FIGS. 8e and 8f respectively, the radial axix ΔP signal 302 is utilized for inertia sealing since gravity acts upon the radial axis.

Accordingly, with the selective connection capabilities of the inertia sealing stage 184 for the ΔP signals 254, 206 and 302, the appropriate connection can be made for desired inertia scaling regardless of the mounting of the manipulator.

The inertia scaling stage 184 provides a square law relationship or in other words operates as a square law function generator by varying the resistance of the element 186 as the square of the pressure input signal from one of the inputs at 254, 206 or 302.

In the preferred embodiment the square law function is provided by an LED (light emitting diode) 188 and a photocell or phototransistor for the variable resistance element 186. The LED 188 and the photocell 186 are positioned relative to each other such that the desired characteristics are achieved. In a specific embooiment, the LED 188 and the photocell 186 are provided as an optocoupler 187 in a common integral housing. For example and for illustrative purposes, a suitable device 187 is available from Clairex Electronics of Mount Vernon, NY, as an LED photoconductor DIP isolator part number CLM50. In another example, a cadmium sulfide photocell and a green LED suitably potted also provided suitable characteristics.

The inertia scaling stage 184 also includes a signal inverting selection arrangement referred to generally at 189 to provide the proper signal sense in accordance with the mounting of the manipulator. In one specific embodiment as illustrated in FIG. 3, the selection arrangement 189 is provided by selectively positionable jumper wires for example with connecting pins and sockets. As shown in FIG. 3, the selective arrangement 189 corresponds to the appropriate circuit connection for the floor mount (FIG. 8a), the wall mount arm boom right (FIG. 8e) and wall mount arm boom down (FIG. 8c) conditions. The arrangement 189 is connected in the opposite second position from that of FIG. 3 for the ceiling mount (FIG. 8b), wall mount arm boom left (FIG. 8f), and wall mount arm boom up (FIG. 8d) conditions.

The selection arrangement 189 includes a first jumper connection 189a that selectively connects in position 1a+15 volt supply 191 to a first contact at 193 and in position 2 connects a-15 volt supply to a second contact at 193. A second jumper connection 189b in position 1 connects the anode of the LED 188 at 195 to a first contact 197 and in the second position connects the anode of the LED 188 to a ground potential reference at 199. A third jumper connection 189c in position 1 connects the cathode of the LED 188 at 201 to the ground potential 199 and in the second position connects the cathode at 201 to a second contact 203. The contacts 197 and 203 are commonly connected at the junction of two resistors 205 and 207. The circuit node 193 is connected through the series combination of a variable resistor 209 and the resistor 207 to the contacts 197, 203.

While the selection arrangement 189 is illustrated in the specific embodiment of FIG. 3 as a jumper connection arrangement for application where the manipulator mounting is very seldomly changed and/or for ensuring stability of proper circuit connection, it should be realized that in many applications where the mounting of the manipulator is changed on a relatively frequent basis, a switch selection arrangement is also suitable to provide the selection arrangement 189 with three poles or switch stages.

The resistor 205 is connected through a variable resistor 211 to the input 213 for the pressure signal selection arrangement. A capacitor 221 is connected between the junction of the resistors 205 and 211 and ground potential. The pressure input signals 254, 206, and 302 from the respective vertical, rotary and radial axes and referred to as inputs P1, P2 and P3 respectively. The appropriate connection of the inputs P1, P2 and P3 are accomplished by the selection connection of a jumper wire for example between 213 and one of the inputs P1, P2 or P3. However, it should also be understood that in another specific embodiment, a three position swtich is used in place of the jumper wire connection.

Accordingly, with one of the P1, P2 or P3 pressure signals connected, tne pressure input is appropriately arranged by the inverting selection arrangement 189 to drive the LED 188 such that the resistance at 186 varies as the square of the pressure input.

In accordance with further important aspects of the present invention, the rotary axis servo loop circuit 140 is provided with an initializing stabilization arrangement including switch stages 215 and 217. The switch stage 215 is arranged to selectively connect the output 218 of the summer stage 202 and the output of the amplifier/integrator stage 220 so as to shunt or short out the stage 220 when the switch stage is actuated by a control signal 219 connected to an axis enable signal. The switch 219 is connected between the output 218 of the summer stage 202 and a second inverting input of the summer stage 180 so as to connect the output of the summer stage 202 to the inverting input of the summer stage 180 when the switch 217 is actuated at a control input connected to the axis enable signal 219.

When the manipulator apparatus is powered up or turned on for use, for example at the beginning of a shift or after shut-down for any reason, the control system generates a signal at the axis enable input 219 for a predetermined time period for stabilization of the manipulator arm. With the axis enable signal 219 in a condition to actuate the switches 215 and 217, the loop signal at the output of the amplifier/integrator 200 of the velocity loop is initialized to supply a signal equal in magnitude and opposite in sign to the feedback signal at 206. Thus, as the circuitry is powered up and stabilizes and for example where the manipulator is mounted in either the side wall boom right or left position of FIGS. 8e or 8f, the ΔP signal at 206 will be matched by the initializing signal at the output of the integrator 200 to stabilize the arm; the ΔP signal will be non-zero at this time due to the inertial mass systems and the effects of gravity while the control loop has no other signal to maintain stabilization in the initial, at-rest start position.

If the initializing stabiliziation arrangement is provided in each of the major axes rotary, vertical and radial, the initial stabilizing effect will be performed regardless of the mounting of the manipulator.

Of course, in one arrangement the stabilization arrangement is provided in only the major axis as determined by the manipulator mounting. In a specific embodiment, the switch stages 215 and 217 are FET semiconductor devices.

Considering now the vertical control system of the present invention and referring now to FIG. 2, the vertical servo-loop 142 includes a position error command signal 236 that is connected to one input of a summer stage 239. The output of the summer stage 239 is connected to a first input of a second summer stage 240. The summer stage 240 also includes as inputs the vertical axis velocity command signal 242 and a velocity feedback signal 244. The velocity feedback signal 244 is derived from the vertical velocity transducer 110 through an amplifier 246. The output 248 of the summer stage 240 is connected through an amplifier/integrator stage 250 to one input of a summer stage 252.

The acceleration command signal 238 is connected through an inertia scaling stage 184 to provide the inertia scaled command signal 253 to a second input of the summer stage 252. A third input of the summer stage 252 is connected to the differential pressure feedback signal 254 obtained by a pressure feedback sensor 256 that senses differential pressure across the vertical axis actuator 258. Additionally, the accelerometer feedback sensor 80 is connected through an amplifier 260 as an input to the summer 252. The acceleration feedback is provided for additional servo-loop control capabilities. The accurate sensing of acceleration in the vertical axis is more readily and accurately obtained than is acceleration feedback in the rotary axis. Thus the acceleration feedback in the vertical axis provides additional dynamic information to the servo-loop 142 in addition to the pressure feedback at 254.

The output 262 of the summer stage 252 is connected through an amplifier/integrator stage 264 and a diode linearizing stage 266 to a power amplifier 268. The power amplifier 268 drives the vertical servo-coil and valve arrangement 270. The servo-coil and valve arrangement 270 controls positioning of the vertical actuator 258. Operation of the vertical axis servo-loop 142 is similar to that of the rotary axis servo-loop 140 discussed hereinbefore. Further the vertical axis controller 124 operates in a similar manner to that of the rotary axis controller 122. The vertical axis contoller 124 obtains position feedback information from the vertical encoder 75.

The vertical axis controller 124 supplies the acceleration command signal 238, the velocity command 242 and the position error command 236. The inertial scaling stage 184 in response to the appropriate pressure input signal and the acceleration command signal 238 provides the inertia scaled acceleration command signal 253 to the servo loop 142.

The vertical servo-loop 142 is also provided with an initializing stabilization arrangement including swtich stages 271 and 273. The switch stage 271 is arranged to selectively connect the input and the output of the amplifier integrator stage 264 when the switch stage 271 is actuated over the axis enable signal input 275. The switch stage 273 is arranged to selectively connect the input of the amplifier/integrator stage 262 and an inverting input of the summer stage 239 when the switch stage 273 is actuated over the axis enable signal 275.

While the position error signals 274, 170 and 236 of the various servo loops are referred to as position error command signals, it should be understood that these signals are not strictly command signals since they represent the difference between position command signals and position feedback signals.

Considering now the radial axis servo-loop 144 and referring now to FIG. 3, the position error command signal 274 is connected to a first input of a summer stage 275. The output of the summer stage 275 is connected to a first input of a second summer stage 290. The summer stage 290 also includes as inputs the velocity command signal 280 and a velocity feedback signal provided by the radial velocity transducer stage 114 through an amplifier 292. The output 294 of the summer stage 290 is connected through an amplifier/integrator stage 296 to one input of a summer stage 298. The summer stage 298 also includes an acceleration command 300 from the analog stage 232 as an input. The summer stage 298 also receives a pressure feedback signal 302 as an input derived from a pressure feedback sensor 304 that measures the differential pressure across a radial axis actuator 306 as discussed hereinbefore. The summer stage 298 also receives an acceleration feedback signal 308 derived from the velocity feedback signal from amplifier 292 by a differentiator stage 310. The output 312 of the summer stage 298 is connected through an amplifier/integrator stage 314 and a diode linearizer stage 316 to a power amplifier 318.

The power amplifier stage 318 controls the radial axis servo-coil and valve arrangement 320. The servo-coil and valve arrangement 320 controls operation of the radial axis actuator 306.

The radial servo-loop 144 is also provided with an initializing stabilization arrangement including switch stages 322 and 324. The switch stage 322 is arranged to selectively connect the input and the output of the amplifier/integrator stage 314 when the switch stage 322 is actuated over the axis enable signal input 326. The switch stage 324 is arranged to selectively connect the input of the amplifier integrator stage 262 and an inverting input of the summer stage 239 when the switch stage 324 is actuated over the axis enable signal input 326.

The control arrangements for the Bend, Yaw and Swivel axes are similar to the arrangements 128, 310, 132, 146, 148 and 150 described in U.S. Pat. No. 4,362,978 and shown in FIG. 6 of that patent. These control arrangements in specific embodiments are provided with initilializing stabilization arrangements and/or inertia scaling stages 184 for work applications where these arrangements are considered desirable.

While there has been illustrated and described several embodiments of the present invention, it will be apparent that various changes and modifications thereof will occur to those skilled in the art. For example, while inertial scaling of the acceleration command has been described, it should be understood that similar inertial scaling is also provided in specific embodiments for one or more axes for the position error or velocity command signal or other command signals. Further, it should also be understood that inertia scaling in specific embodiments is also provided in response to other feedback signals related to force or inertia other than the differential pressure of the actuators. Additionally the various command signals in various specific embodiments is provided by control apparatus other than the on-line control apparatus 120 and the axis controller stages 122, 124 and 126 including either analog or other digital circuitry. Concerning the inertia scaling stage 184, in various other specific embodiments the modification of the command signal is accomplished with arrangements other than the optocoupler 187 in response to a force feedback signal. Further, the present invention in specific embodiments is accomplished utilizing a digital servo loop arrangement with inertia scaling being provided in response to appropriate inertia correlated feedback with appropriate inertia scaling functional relationship such as a function generator, equation, or look-up table. Also, the initializing stabilization of the present invention in specific embodiments is also accomplished with a digital servo loop to initialize the velocity loop amplifier/integrator function in response to an axis enable signal with the initial value that is set in accordance with the sensed pressure or other force correlated signal such that the initializing output of the velocity amplifier/integrator is the same as the sensed feedback signal before the axis enable signal. It is intended in the appended claims to cover all such changes and modifications as fall within the true spirit and scope of the present invention.

What is claimed as new and desired to be secured by Letters Patent of the United States is:

1. A control system for manipulator apparatus having an arm movable in a plurality axes and including control apparatus that provides command signals in response to program data and arm position data, said control system comprising:
    means for providing a scaling signal derived from one or more of said axes and correlated to the inertial mass system of said arm;
    means responsive to said command signals and said scaling signal for modifying one or more of said command signals; and
    means responsive to said command signals for moving said arm in said plurality of axes.

2. The control system of claim 1 wherein said manipulator apparatus includes hydraulic actuator means for one or more of said axes and said control system further comprising means for sensing the pressure in one or more of said hydraulic actuators, said scaling signal being derived from said sensed pressure.

3. The control system of claim 2 wherein each of said actuators is a double acting actuator and said sensed pressure is a differential pressure across said respective double acting actuator.

4. The control system of claim 2 wherein the actuator for the axis that is used for pressure sensing for said scaling signal is determined such that the sensed pressure is correlated to the inertial mass system of said arm.

5. The control system of claim 1 wherein said sealing signal is a dynamic signal representing the dynamic inertia of said arm.

6. The control system of claim 1 wherein said manipulator arm is movable in a rotary axis for movement in a horizontal plane with respect to a base when said base is parallel to the ground plane, said arm being movable in a vertical axis for up-down movement with respect to said base, and in a radial extension axis for in-out movement, said scaling signal being correlated to inertia in said vertical axis when said base is mounted parallel to the ground plane.

7. The control system of claim 6 wherein said scaling signal is correlated to inertia in said radial extension axis when said manipulator apparatus is mounted with said base in a generally vertical plane and said radial extension axis is generally vertical.

8. The control system of claim 7 wherein said scaling signal is correlated to inertia in said rotary axis with said base being mounted in a generally vertical plane and said radial extension axis is generally parallel to the ground plane.

9. The control system of claim 8 wherein said command signal modifying means further comprises selectively operable means for selectively providing modification of said command signal in the correct direction correlated to the mounting of said manipulator apparatus.

10. The control system of claim 2 wherein said signal modifying means comprises square law function generator means for modifying said command signal as the square of the scaling signal.

11. The control system of claim 10 wherein said square law function generator means comprises a light emitting diode connected to said scaling signal and a photocell responsive to said light emitting diode, said command signal being connected in series with said photocell to provide said modified command signal.

12. A method for scaling a command signal in a control system for a manipulator arm controllable in a plurality of axes in accordance with the inertial mass system of the controlled manipulator arm comprising the steps of:
    deriving a signal in one or more of the axes of the manipulator arm correlated to the inertial mass system of the arm;
    scaling a command signal in response to said inertial mass system correlated signal; and
    controlling the manipulator arm in said plurality of axes in accordance with said inertia scaled command signal.

13. A control system for manipulator apparatus having an arm movable in a plurality of axes comprising:
    servo loop control signal generating means for generating axis control signals for each of said axes in response to program data and feedback signals including arm position data derived from movement of said arm in said plurality of axes, at least one of said feedback signals for one of said axes being correlated to the inertial mass system of said arm and at least one of said axis control signals being provided by summing said inertial mass system correlated feedback signal and an axis command signal, said axis command signal being generated by said servo loop control signal generating means;
    means for providing said feedback signals;
    means responsive to said axis control signals for moving said arm in said plurality of axes; and
    means responsive to a servo enable signal for modifying said servo loop control signal generating means to provide for a predetermined period of time a command signal for one or more of said axes equal in magnitude and opposite in sign to said inertial mass system correlated feedback signal for said respective axis.

14. The control system of claim 13 wherein said servo loop control signal generating means includes for at least one of said axes integration means providing an integration function after summation of said inertia correlated feedback signal and said axis command signal, said modifying means further comprising means for initializing said integrator function of said integrator in response to said servo enable signal for said predetermined period of time.

15. The control system of claim 14 wherein said servo enable signal is a power start up signal, said modifying means providing initializing stabilization for said arm and said arm moving means.

16. The control system of claim 13 wherein said arm moving means includes hydraulically operated actuators for one or more of said axes, said inertia correlated feedback signal being obtained as a sensed pressure signal from said actuator.

17. An initializing stabilization method for manipulator apparatus having an arm movable in a plurality of axes and control arrangements for providing control signals to arm moving arrangements in response to program data and arm feedback signals, the control arrangement for at least one of said axes including a force or pressure loop function, the force or pressure control loop function including an integrator function, the feedback signal in said at least one axis being correlated to the inertial mass system of said arm and being summed with a command signal prior to said integrator function, the output of said integrator function representing said control signal, the process comprising in response to an initializing signal providing for a predetermined stabilization time period a command signal equal in magnitude and opposite in sign to said inertia feedback signal and further eliminating said integrator function for said predetermined stabilization period.

18. The method of claim 17 wherein said control arrangement for said at least one of said axes includes a velocity control loop function for providing said command signal, said velocity control loop function includes an integration function, said command signal being provided by initializing said velocity integrator function in accordance with said inertia correlated feedback signal.

19. The method of claim 17 wherein said initializing stabilization being provided for the axis or axes in which the manipulator arm is effected by gravity.

20. The method of claim 19 wherein said manipulator arm is rotatably mounted on a base for rotary axis movement in a horizontal plane with the base parallel to the ground plane, said arm further being mounted for vertical axis movement with respect to said base, said initializing stabilization method being provided in said vertical axis when said manipulator apparatus is mounted with said base being mounted parallel to the ground plane.

21. The method of claim 20 wherein said initializing stabilization method is provided in said rotary axis when said manipulator apparatus is mounted with said rotary axis movement being in a vertical plane and said manipulator arm extending generally parallel to the ground plane.

22. The method of claim 20 wherein said manipulator arm is mounted for radial extension axis movement and said initialization stabilization method is provided in said radial extension axis when said manipulator apparatus is mounted with said radial extension axis movement in a generally vertical direction.

* * * * *